United States Patent [19]
Lopic et al.

[11] Patent Number: 5,224,795
[45] Date of Patent: Jul. 6, 1993

[54] IRRIGATION REGULATOR

[75] Inventors: Franz Lopic, Nersingen; Christian Stephany, Ulm; Johann Katzer, Neu-Ulm, all of Fed. Rep. of Germany

[73] Assignee: Gardena Kress & Kastner GmbH, Fed. Rep. of Germany

[21] Appl. No.: 744,957

[22] Filed: Aug. 14, 1991

[30] Foreign Application Priority Data

Aug. 14, 1990 [DE] Fed. Rep. of Germany ....... 4025690

[51] Int. Cl.$^5$ .................. E02B 11/00; G05B 11/00
[52] U.S. Cl. ................................ 405/37; 405/36; 137/78.3
[58] Field of Search .............. 405/37, 36, 303; 239/63, 64, 65; 137/78.3, 78.2

[56] References Cited

U.S. PATENT DOCUMENTS

| | | | |
|---|---|---|---|
| 3,874,590 | 4/1975 | Gibson | 405/37 X |
| 3,910,300 | 10/1975 | Tal | 137/78.3 |
| 4,015,616 | 4/1977 | Hanff | 137/78.3 |
| 4,548,225 | 10/1985 | Busalacchi | |
| 4,763,837 | 8/1988 | Livneh | 405/37 X |
| 4,922,945 | 5/1990 | Browne | |
| 4,938,248 | 7/1990 | Browne | 137/78.3 |

FOREIGN PATENT DOCUMENTS

| | | |
|---|---|---|
| 339651 | 11/1970 | Austria . |
| 170217 | 2/1986 | European Pat. Off. . |
| 2618540 | 11/1977 | Fed. Rep. of Germany . |
| 8427544 | 11/1985 | Fed. Rep. of Germany . |
| 280026 | 6/1990 | Fed. Rep. of Germany . |
| 8604212 | 7/1986 | World Int. Prop. O. . |

Primary Examiner—Dennis L. Taylor
Assistant Examiner—J. Russell McBee
Attorney, Agent, or Firm—Quarles & Brady

[57] ABSTRACT

A moisture sensing device (2) operating according to the tensiometer principle which in the case of complete drying out emits the same signal as on reaching the maximum moisture content, in the case of complete drying out emits a signal corresponding to that with the minimum, set moisture content. A drying out prevention means (40) provided for this operates with the same contactor (24) and is operated by the same control member (18) as the sensing device (2) in normal operation. The switching point for the drying out prevention means (40) can be adjusted by means of an adjusting device (48). However, the water supply is switched on by the signal emitted on drying out.

35 Claims, 1 Drawing Sheet

IRRIGATION REGULATOR

BACKGROUND OF THE INVENTION

The invention relates to a regulator for watering or irrigation installations and the like, such as are in particular used in horticulture, agriculture, etc.

Such regulators appropriately have a moisture sensing device. Tensiometers have proved satisfactory, but it is also possible to use sensing devices based on a different principle. The sensing device operates a signal device for emitting a signal at at least one moisture or dryness content. This signal can be used for a display, opening a water inflow, as a control signal for a control device controlling the water inflow in a delayed or time-dependent manner, etc.

Moisture sensing devices suffer from the disadvantage that at least in the partly moist state, they do not function correctly if they have substantially completely dried out. The sensing result supplied to the sensing device can then be the same as that corresponding to a high moisture content and then, despite the complete drying out of the sensed area, the emitted signal corresponds thereto. The emitted signal is then a false signal not identified by the sensing device, the signal device or the control device.

BACKGROUND OF THE INVENTION

An object of the invention is to provide a regulator of the aforementioned type, which avoids the disadvantages of known solutions and in which the emitting of a false signal in the case of drying out can be avoided in a simple manner.

According to the invention, this object is achieved by means for protecting the sensing device against an at least longer-term drying out, and in most cases, it is sufficient if any possible drying out is detected within a few hours and cancelled out again.

In order to obviate the use of relatively complicated means, such as e.g. a separate moistening or sensing device for the sensor of the sensing device, the moisture in the vicinity of the main sensor, or directly on or through the same, is determined by a moisture sensor, and in the case of a substantially complete drying out, a separate control process e.g. leads to the opening up of the water supply existing through the irrigation installation, so that there is an automatically regulating protection against drying out.

Instead of providing a separate sensing device for drying out protection purposes parallel or in series with the protected sensing device, in simple manner, the sensing device can be used both for emitting signals in normal operation between an upper and a lower moisture value, as well as for a moisture value close to drying out and which is well below said lower moisture value. For this purpose, a corresponding characteristic deflection brought about by the sensing device is utilized.

In the case of a tensiometer, which has a pressure chamber with a boundary to be placed on the area to be sensed, e.g. in the soil, and which is gas and water-permeable due to porosity or the like, the working characteristic of the sensing device can be chosen in such a way that the signal for water supply purposes is emitted at an underpressure of more than approximately 60 mb, but not at lower underpressures and e.g. extending to roughly 20 mb. Below this lower value, the signal is emitted by the drying out protection means, so that the water supply is opened and finally the underpressure of the protected sensing device can be again increased to a value where it can operate normally.

If, in such a sensing device, the permeable boundary has dried out to a certain extent, then the underpressure or vacuum in the pressure chamber drops because air is drawn in through the boundary. However, this pressure rise precisely corresponds to the behavior of the pressure chamber occurring with increasing moisture or wetness, because then the water penetrates through the boundary into the pressure chamber. However, a pressure rise in the pressure chamber, leading to an error or false signal, can also occur due to damage or leaks in the pressure chamber or with excessive dryness due to climatic conditions. This false signal would then lead to the water supply remaining cut off despite the dryness, without it being possible for the regulator to give the correct signal.

In a very simple embodiment, the path of a control member moving as a function of the moisture content is used over a portion for emitting or interrupting the signal in normal operation, whereas a further portion not directly connected to the first-mentioned portion is used for signal emission by the drying out protection means. An intermediate portion between these two portions serves as an idle path.

A further simplification is obtained in that for the emission of a signal on the part of the protected sensing device on the one hand and the drying out protection means on the other, use is made of one and the same contactor in place of separate contactors. A very reliable operation is obtained if the contactor has two movable contacts, whereof one is moved by the protected sensing device or on one portion and the other is moved by the drying out protection means or the other portion, while the contactor remains in the idle path in its inoperative position corresponding to no signal emission. If the contactor is an operating contact, then it is closed in the inoperative position and opened again for emitting a signal.

According to the invention, the inventive regulator can be given a very advantageous construction in place of or in addition to that described. For example, at least one of the components can be formed by the contactor of the sensing device, at least one adjusting member, an electrical connection, an actuating member for the sensing device and the control member, can be provided on a subassembly, which is preferably constructed as a sealing cover or lid for the pressure chamber and can be easily detachably connected thereto e.g. by a thread.

At least one and up to all the aforementioned components are advantageously placed in a casing, which is closed in substantially its full width with a casing cover or lid which can be opened or removed, so that after opening the said cover, each of the components located in the casing is exposed in a readily accessible manner for maintenance and/or repair purposes.

At least one to all the components of the drying out protection means can belong to the subassembly, or can be correspondingly arranged in the flat casing, whose one side is appropriately partly bounded by the control member or diaphragm. A return or restoring spring for the control member can be located outside the casing area or in the pressure chamber, but is appropriately also a component of the subassembly.

BRIEF DESCRIPTION OF THE DRAWINGS

These and further features of the invention can be gathered from the claims, description and drawings and the individual features, either singly or in the form of subcombinations, can be realized in an embodiment of the invention and in other fields and represent protectable constructions for which protection is hereby claimed. An embodiment of the invention is described in greater detail hereinafter relative to the drawings, wherein;

DETAILED DESCRIPTION OF THE PREFERRED EMBODIMENTS

Figure 1:
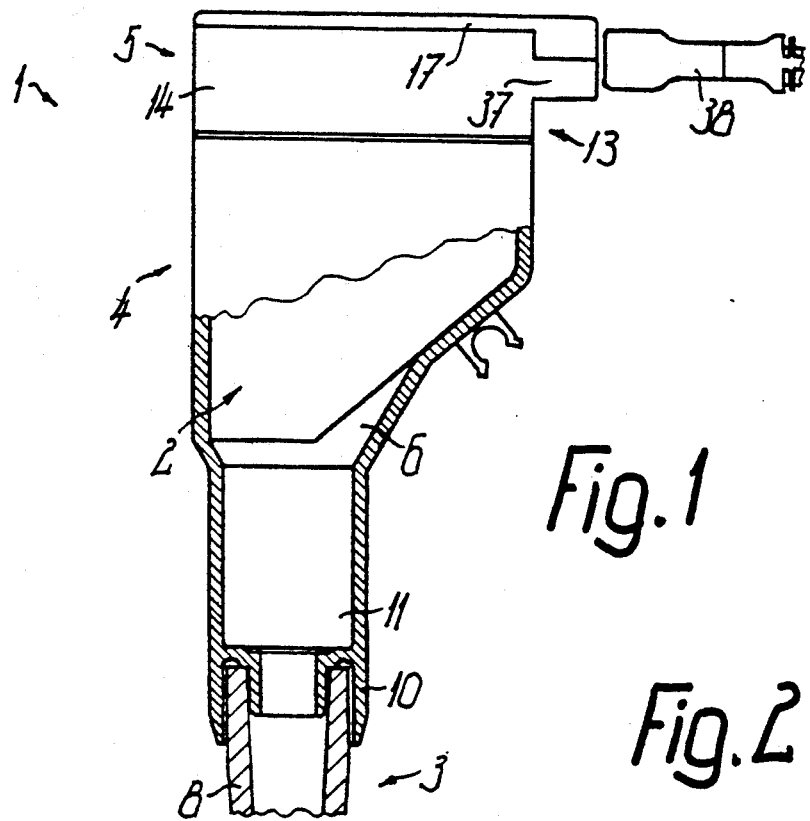
FIG. 1 shows an inventive regulator in a part sectional view.
Figure 2:
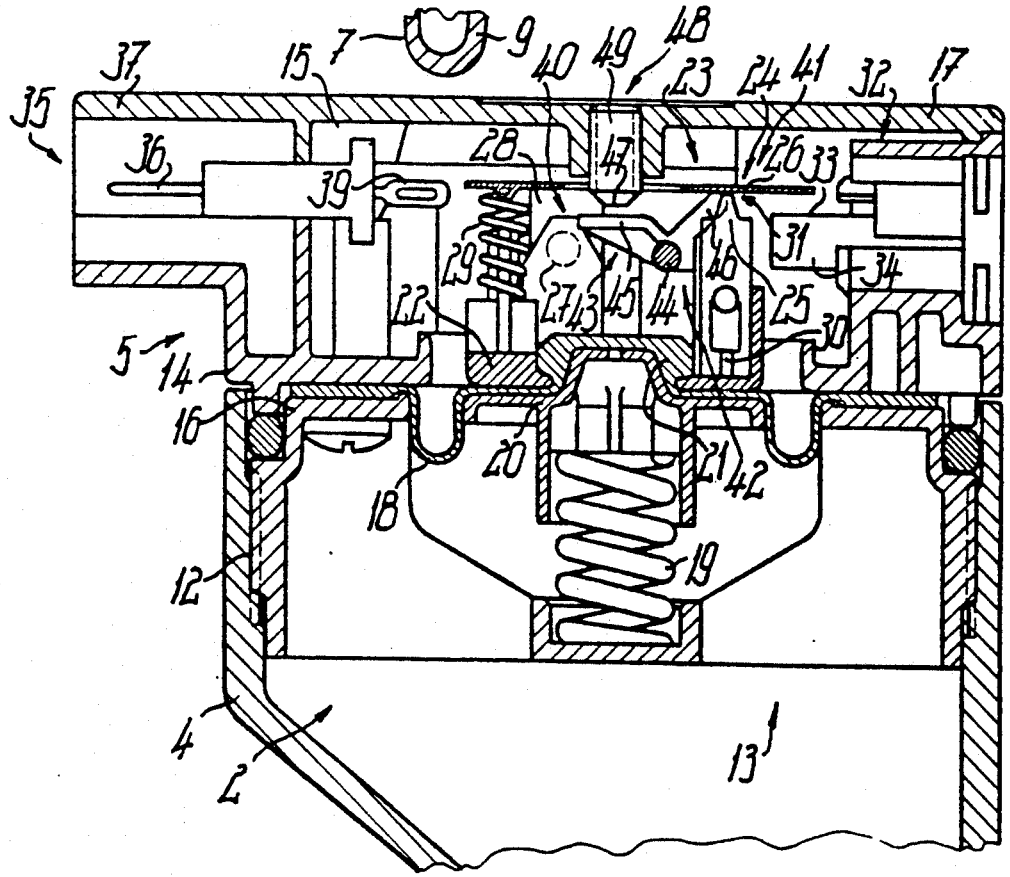
FIG. 2 shows a detail of FIG. 1 in a larger-scale, sectional representation.

The regulator 1 forms a constructional unit with an encapsulated sensing device 2 and a sensor 3 positioned below it, which is arranged on or formed by a support, namely, a casing 4 made from glass or the like. The upper, widened end of the casing 4, which opens to the full width, is sealed with a cover or lid 5 in such a way that an upwardly widened pressure chamber 6 is formed in the casing 4, and in the lower region, a tip 7 is formed, with which the regulator 1 can be pressed in the manner of a spike into the soil. A lower, several centimeters long, acute-angled conical and cup-spherically rounded end portion of the tip 7, which can have a diameter of roughly 2 cm or less, forms in the lower region the only boundary 8 of the casing interior, which in operation is located directly on the soil or ground, so that there is a relatively slow water exchange from the moister area through the boundary 8 to the drier area. The boundary 8 is formed by a shell-like, hollow clay body 9, whose upper open end is overengaged in circular groove-like manner on the inner and/or outer circumference by a flange 10 of the casing 4 and is fixed in sealing manner with respect thereto by bonding.

Immediately above the clay member 9 is provided a reservoir 11, which is shorter than the member 9 and which is constantly line-connected by a channel in the interior of the flange 10 to the slightly narrower interior of the clay body 9. The jacket of the reservoir 11 is only slightly wider than the clay body 9, so that the reservoir 11 can also be sunk into the ground over virtually its entire height. In addition, the casing 4 is considerably widened, so that, due to the displacement resistance, under normal force expenditure, it cannot be pressed further into the soil and is instead stop-limited. Thus, when the soil is particularly wet, the casing 4 can only fill with water roughly to the upper end of the reservoir 11.

The upper end of the reservoir 11 passes into a widened, laterally displaced casing area, which is substantially axially parallel to the reservoir 11 and the tip 7. The casing area defines a pressure chamber 6 above the water level, and therefore, as a function of the degree of filling, jointly with the reservoir 11 or the clay body 9. By means of a cover or lid thread 12, the cover or lid 5 can be screwed to the inside of the upper jacket end of the casing 4 in about the associated casing axis and sealed with a sealing ring.

In the manner of an apparatus head, the cover 5 forms a subassembly 13, which, can be easily detached by means of the cover thread 12 and which in top plan view, has roughly the same size as the upper end of the casing 4, but is much shorter than the casing 4. As a basic body, said subassembly 13 has a casing 14, whose shell-shaped main part is detachably connected to a cap-like flange 16 on the outside of the shell bottom. The flange 16 engages with an external thread on the flange jacket the cover thread 12 and is located substantially completely within the casing 4. Between a ring shoulder on the outer circumference of the flange jacket and a ring web on the bottom of the casing shell, the ring seal is so axially fixed that it engages adjacent to the thread 12 on the inner circumference of the casing 4. The casing 14 is closed with a flat casing cover 17 on the upper end remote from the casing bottom.

Between the circular, disk-like shell bottom of the casing 14 and the circular disk-like jacket of the casing flange 16, the outer circular disk-like edge of an approximately disk-like control member 18 is fixed in sealed manner within the ring seal. The control member 18 can be a flexible diaphragm. In cross-section, the member 18 forms following onto the fixed outer rim an e.g. U-shaped ring or bellows profile, which projects away from the casing bottom in the interior of the casing flange 16 and past the opening of the cap bottom. The central area of the control member 18 located within the bellows profile is spring-loaded axially into the casing area 15 by a return spring 19 located substantially below it and within the casing flange 16.

At its lower end, the return spring 19 is supported in a cup-shaped abutment, carried by spoke webs, of the casing flange 16 and at its upper end, within a socket of a pressure piece 20. The piece 20 engages the lower side of the inner circumference of the bellows profile and the central region of the control member 18 in a substantially whole-surface and circular disk-like manner. In the center the pressure piece 20 has a cross-sectionally rectangular or square projection, projecting upwardly towards the casing area 15, and which engages in a closely adapted depression of a central, much thicker diaphragm head 21.

This diaphragm head 21 is correspondingly rectangular, and has on the outer circumference, in the vicinity of the jacket of the projection of the pressure piece 20, a circular groove, in which engages a support 22 with a ring web and is therefore fixed both axially and against rotation by means of a snap connection. Between a circular disk-like bottom of the support 22 and the outer circumferential region of the pressure piece 20 is therefore fixed the profile portion of the control member 18 connected to the inner circumference of the bellows profile, and by means of said profile portion, the pressure piece 20 is directly supported on the support 22. The support 22 can be supported by sliding cams against radial deflections of the area of the control member 18 located within the bellows profile, and said cams appropriately project from the inner circumference of the opening of the casing shell bottom against the outer circumference of the support 22 and are substantially uniformly distributed over the circumference. When the control member 18 is fixed or in the central position, the bottom of the support 22 is roughly in the plane of the shell casing bottom.

The support 22 axially movable by means of the control member 18 in the case of a changing pressure in the pressure chamber 6, supports the correspondingly movable components of a signal device 23. The device 23 has on one side adjacent to the casing axis a contactor 24, e.g. a contact switch with a fixed contact and a movable contact on the support 22. The contact 26, which is located on the side of the contact 25 remote from the control member 18 or immediately adjacent and approximately parallel to the inside of the cover 17, is formed by a substantially plate-like sheet metal part approximately at right angles to the casing axis and from whose longer lateral edges are bent two facing bearing legs 28. The leg 28 are pivotably mounted about an axis on the side of the casing axis remote from a contact zone 31 of the contactor 24 in contact bearings 27, which are approximately at right angles to the casing axis, are positioned transversely to the longitudinal direction of the contact plate and are displaced relative to the control member 18 opposite the same.

The support 22 has two corresponding bearing legs with bearing openings located on either side of its central opening and projecting into the casing area 15 and into which are snapped projecting journals or pivot pins of the bearing legs 28 by resilient pressing apart or together. On the shorter leg of the contact 26 located on the same side of the casing axis as the contact bearing 27 is supported a contact spring 29, which is engaged on a freely projecting centering mandrel of the support 22 and loads against the contact 25 the area of the contact 26 belonging to the contact zone 31. The contact 25 is formed by a strip-like sheet metal component. The component forms with an end portion projecting tongue-like over a terminal edge the contact surface and with its other end portion is inserted in freely standing manner into a contact holder 30 of the support 22, as well as being optionally secured by bracing or self-engaging locking.

For the contactor 24 is provided an adjusting device 32 enabling the switching point of the signal device 23 to be adjusted. The adjusting device 32 has an adjusting member 33 accessible from the outside of the regulator 1, but which is substantially completely countersunk with respect to the outer faces and which is mounted in a socket of the casing jacket so as to be rotatable about an axis roughly at right angles to the casing axis and roughly parallel to the longitudinal direction of the contact 26. The bearing socket into which the adjusting member 33 is inserted from the outside of the casing and locked by a snap connection, projects inwards over the casing jacket and is located on the casing shell. In the head of the adjusting member 33, which is accessible from the outside, can e.g. be provided a coin slot for operating purposes. Over the inner end of the adjusting member 33 projects an adjusting cam 34, which e.g. has on the circumference a cam member which is eccentric or spiral with respect to the rotation axis and is located in the movement area of a portion of the contact 26 extended beyond the contact zone 31.

The casing 14 has an electrical connection or terminal 35 projecting past its outer circumference with a plug 36 located within a hollow connecting piece 37 and which is secured between the casing shell and the casing cover 17 and which is intended for connection to an apparatus plug to be slid into the connecting piece 37 and which is therefore protected against overloading. Within the casing area 15, the plug has two freely projecting connecting lugs 39, which are connected by means of not shown lines in the vicinity of the contact holder 30 to the contact 25 and in the vicinity of the immediately adjacent shorter leg to the contact 26.

The inventive regulator functions according to the following procedure. If the soil is kept adequately moist, the clay body 9 and/or reservoir 11 is at least partly filled with water. If the moisture content of the soil drops, then water is drawn out to the soil by the clay body 8. Thus, in the pressure chamber 6, a vacuum is formed by which the control member 18, including the support 22, is moved counter to the tension of the return spring 19 in the direction of the pressure chamber 6. As a function of the setting of the adjusting device 32, in the case of a vacuum of approximately 60 to 140 mb, the contact 26 passes onto the adjusting cam 34, so that it remains fixed to the casing, whereas the contact 25 moves on and consequently the contactor 24 is opened. This opening action serves as a signal supplied by a control line to an irrigation computer, which opens the water supply optionally for a set time period. As a result, the soil moisture content rises again, water passes back through the clay body 9 into the interior of the regulator and the pressure in the pressure chamber 6 rises, e.g. to a value of approximately 20 mb, at which point the contactor 24 is closed again and the water supply switched off.

If e.g. the water supply is not sufficient, due to extreme heat or evaporation, to ensure a moistening of the soil to such an extent that water can trickle back into the clay body 9, then the water level gradually sinks below the exposed area of the clay body wall, which consequently dries out. However, in the dry state, the clay body wall is no longer gas-tight, so that due to the relatively high vacuum in the pressure chamber 6, air is drawn from the soil and consequently the pressure in the pressure chamber 6 rises with the described signal action, i.e. the interruption of the water supply. In order to again bring about the correct operation of the regulator 1, either the soil must be manually watered or the regulator 1 must be opened and the reservoir 11 filled with water.

In order to obviate these disadvantages, according to the invention, a drying out protection means 40 is provided. The latter also has a signal means 41, formed by the signal device 23, operated by the control member 18 or the pressure chamber 6, so that only a single contactor 24 is required. However, the signal "water supply" is not given during the described movement path of the control member 18, but during the movement which the control member 18 normally performs on emitting the signal "switch off water supply" or "do not switch on water supply".

For this purpose, the signal means 41 has an actuating member 42 movable with the control member 18 and which is pivotably arranged about an axis on the support 22 and, as explained relative to the contact bearing 27, can be aligned or parallel thereto. The associated bearing 44 is appropriately located between the contact bearing 27 and the contact 25 on its side of the casing axis. The actuating member 42 in the manner of a two-arm lever forms a rocker 43 with a longer control arm 45 with respect to the leverage, which is directed against the casing axis or which crosses the latter roughly at right angles, as well as a shorter actuating arm 46 directed in sloping manner against the contact side of the contact 26. The actuating member 42 mounted in freely pivotable manner on the same side of the contact 26 as the contact 25 and without influencing by spring tension is appropriately snapped with journals or pivot pins in openings of bearing legs which, facing one another, project roughly the same amount from the bottom of the support 22 as the bearing legs for the contact 26 and are adjacent thereto. Between the journals, the actuating arm 46 forms two individual arms with rounded end faces on either side of the contact 25.

With the control arm 45 is associated an operationally casing-fixed stop 47, which projects from the inside of the cover 17 and which transverse an opening in the plate of the contact 26.

If the pressure in the pressure chamber 6 rises to a value fixed by the stop 47 of e.g. more than −20 mb, then the control arm 45 runs up against the stop 47, so that during the further movement of the control member 18 or the support 22, the rocker 43 is pivoted in such a way that the actuating arm 46 raises the contact 26 from the contact 25 in opposition to the tension of the contact spring 29, so that said signal is obtained. This switching point of the drying out protection means 40 is appropriately continuously variable between approximately 0 and −20 mb.

For this purpose, an adjusting device 48 is provided. This can be formed in simple manner in that the stop 47 is adjustable with an adjusting member 49, namely formed by the inner face of an adjusting screw, which is thread-guided roughly in the casing axis in the casing cover 17 the adjusting member 49 is completely embedded or flush, but is always accessible from the outside of the casing 14 or the cover 17 and can e.g. be operated with a screwdriver.

We claim:

1. An irrigation regulator, comprising:
    at least one moisture sensing device (2), and at least one signal device (23) operable by said sensing device for emitting a signal corresponding to at least one value of moisture in said at least one moisture sensing device, said at least one moisture sensing device being capable of reaching a critical point of dryness resulting in a false operation of said signal device, wherein a drying out protection means (40) is associated with at least one of said at least one sensing device (2) for automatically re-moisturizing said at least one sensing device upon reaching said critical point.

2. The regulator according to claim 1, wherein said protection means (40) is provided for protecting said sensing device (2) against drying out.

3. The regulator according to claim 1, wherein said at least one moisture sensor has a gas permeability and said protection means operates as a function of said gas permeability.

4. The regulator according to claim 1, wherein at least one of said at least one signal device (23) emits a signal down to a low value of moisture; said protection means (40) emitting a signal below said low value of moisture.

5. The regulator according to claim 4, wherein said signal device (23) and said protection means (40) emit a signal in case of a substantially complete drying out of at least part of at least one of said at least one sensing device (2).

6. The regulator according to claim 4, wherein said signal device (23) and said protection means (40) emit a signal in case of a gas-permeable drying out of said moisture sensing device.

7. The regulator according to claim 1, wherein a common moisture sensor (3) is provided for said sensing device (2) and said protection means (40).

8. The regulator according to claim 1, wherein said drying out protection means (40) has at least one actuating member (42) for a signal means; said actuating member being controlled by said sensing device.

9. The regulator according to claim 8, wherein said signal means is at least one of said at least one signal device (23).

10. The regulator according to claim 1, further comprising at least one moisturizing device for opening a fluid supply upon a signal from one of said signal device and said protection means.

11. The regulator according to claim 10, wherein at least one of said at least one moisturizing device is operated by said signal device in case of drying out.

12. The regulator according to claim 1, wherein at least one of said at least one sensing device (2) has at least one control member (18), said control member emitting a control signal for opening a fluid supply in a first end position of a motion path and said protection means (40), in an opposite end position of said at least one control member (18), emitting a signal for opening a fluid supply.

13. The regulator according to claim 12, wherein said at least one control member (18) is at least one of members provided by a diaphragm and a chamber separator, said control member being movingly operated as a function of sensed moisture.

14. The regulator according to claim 1, wherein an actuating member (41) of said protection means (40) is controlled by means of a pressure chamber (6) at least partly bounded by a gas and moisture-permeable sensor (3) of said moisture sensing device (3).

15. The regulator according to claim 14, wherein said actuating member (41) is controlled by a control member (18) movable as a function of a pressure in said pressure chamber (6).

16. The regulator according to claim 14, wherein said pressure chamber (6) commonly controls both said signal device (23) and said protection means (41).

17. The regulator according to claim 1, wherein said protection means (40) includes at least one electrical contactor (24).

18. The regulator according to claim 17, wherein said at least one contactor (24) has at least one switching contact (25) operable as a signal generator for said sensing device (2).

19. The regulator according to claim 17, wherein said at least one contactor (24) is operated by separate actuating members of said sensing device (2) and said protection means (40).

20. The regulator according to claim 17, wherein said at least one contactor (24) has at least two movable switching contacts (25, 26), one of said switching contacts being operated by said sensing device (2) and another one of said switching contacts by said protection means (40).

21. The regulator according to claim 20, wherein at least two of said contacts (25, 26) are located on a common support (22) for operational motion by a control member (18).

22. The regulator according to claim 20, wherein an actuating member (42) of said protection means (40) engages on a contactor (24) directly adjacent to a contact zone (31) of at least two of said contacts (25, 26).

23. The regulator according to claim 1, further comprising a first contact (25) to be operated by said sensing device (2) and a second contact (26) to be operated by said protection means (40); said first contact being laterally disposed next to said second contact on a side facing at least one of components provided by a pressure chamber (6) and a control member (18).

24. The regulator according to claim 1, further comprising an adjusting member for adjusting signal switching points of at least one of components provided by said at least one sensing device (2) and said protection means (40).

25. The regulator according to claim 1, further comprising separate adjusting members for independently adjusting signal switching points of at least one of components provided by said at least one sensing device (2) and said protection means (40).

26. The regulator according to claim 25, wherein at least one of said adjusting members is a rotary adjusting member (33, 49) accessible on an outside of said regulator (1).

27. The regulator according to claim 25, wherein at least one of said adjusting members forms a run-up stop (34, 47) for an associated operation of a contactor (24) of said signal device.

28. The regulator according to claim 1, further comprising a subassembly (13) including at least one of components defined by a contactor (24) of said sensing device (2), a contactor of said protection means (40), at least one adjusting member (33, 49), an electrical connection (35), an actuating member for said sensing device (2), an actuating member for said protection means (40) and a control member (18).

29. The regulator according to claim 28, wherein said sub-assembly (13) has an external casing (14) constructed as a sealing cover for a pressure chamber (6).

30. The regulator according to claim 28, wherein said sub-assembly (13) is provided with an exposed casing cover (17) for a large-area access to an internal casing space (15).

31. An irrigation regulator, comprising:
a moisture sensing device for sensing moisture values in a surrounding environment;
at least one signal device operable by said sensing device for sending control signals to a water supply for said environment, said signal device emitting an "on" signal adapted to turn on said water supply when said moisture sensing device senses a low value of moisture in said surrounding environment, and said signal device emitting an "off" signal adapted to turn off said water supply when said sensing device senses a higher value of moisture in said surrounding environment, said sensing device providing a false influence on said signal device to emit said off signal when said sensing devices encounters a critically low value of moisture below said low values; and
means for overriding said false influence and turning on said water supply when moisture values in said surrounding environment reach said critically low value.

32. The regulator according to claim 31, wherein said overriding and turning means turns on said water supply when said sensing device dries out.

33. An irrigation regulator, comprising:
at least one moisture sensing device (2);
at least one signal device (23) operable by said sensing device for emitting a signal corresponding to at least one value of moisture, said at least one moisture sensing device being capable of reaching a critical point of dryness resulting in a false operation of said signal device;
drying but protection means (40) is associated with said at least one sensing device (2) for automatically remoisturizing said at least one sensing device upon reaching said critical point, wherein said drying out protection means includes a rocker pivoted by said moisture sensing device to actuate said signal device to emit said signal when said critical point is reached.

34. The regulator according to claim 33, further comprising a run-up stop, said rocker including a control arm that engages said run-up stop to pivot the rocker into a position for actuating the signal device when the critical point is reached.

35. The regulator according to claim 33, wherein the signal device includes a displacable contact and the rocker includes a control arm for engaging and displacing the contact to actuate the signal device when the critical point is reached.

* * * * *